(12) United States Patent
Nakanoya et al.

(10) Patent No.: US 10,416,976 B2
(45) Date of Patent: Sep. 17, 2019

(54) DEPLOYMENT DEVICE, DEPLOYMENT METHOD, AND RECORDING MEDIUM

(71) Applicant: NEC Corporation, Minato-ku, Tokyo (JP)

(72) Inventors: Manabu Nakanoya, Tokyo (JP); Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/743,315

(22) PCT Filed: Jul. 21, 2016

(86) PCT No.: PCT/JP2016/003407
§ 371 (c)(1),
(2) Date: Jan. 10, 2018

(87) PCT Pub. No.: WO2017/017937
PCT Pub. Date: Feb. 2, 2017

(65) Prior Publication Data
US 2018/0203680 A1    Jul. 19, 2018

(30) Foreign Application Priority Data
Jul. 27, 2015    (JP) .................................. 2015-147408

(51) Int. Cl.
*G06F 8/60*    (2018.01)
*G06F 8/71*    (2018.01)
(Continued)

(52) U.S. Cl.
CPC .................. *G06F 8/60* (2013.01); *G06F 8/71* (2013.01); *G06F 9/45558* (2013.01); *G06F 9/48* (2013.01);
(Continued)

(58) Field of Classification Search
CPC .......... G06F 8/60; G06F 8/71; G06F 9/45558; G06F 9/48; G06F 9/5077
(Continued)

(56) References Cited

U.S. PATENT DOCUMENTS

| 6,536,037 B1 * | 3/2003 | Guheen et al. ........... G06F 8/71 |
| | | 717/151 |
| 2002/0032900 A1 * | 3/2002 | Charisius .................. G06F 8/71 |
| | | 717/106 |

(Continued)

FOREIGN PATENT DOCUMENTS

JP    2013080275 A    5/2013

*Primary Examiner* — Wei Y Zhen
*Assistant Examiner* — Mohammed N Huda

(57) ABSTRACT

A configuration definition file created for a certain environment is easily applied to system deployment into another environment. A component information storage unit of a deployment device stores component information including, for each constituent element to constitute a system, setting information independent of deployment tools, and for each combination of each constituent element and each deployment tool available for deploying the constituent element, a deployment process for deploying the constituent element by the deployment tool. The component identification unit identifies, for each constituent element, a deployment process associated with a designated deployment tool, based on the component information. The sequence determination unit determines an execution sequence of the identified deployment processes, based on dependency relationships among the constituent elements. The deployment execution unit executes the identified deployment processes according to the execution sequence and applying setting information for the constituent elements, and thereby deploys the constituent elements.

10 Claims, 12 Drawing Sheets

(51) Int. Cl.
  *G06F 9/48* (2006.01)
  *G06F 9/455* (2018.01)
  *G06F 9/50* (2006.01)

(52) U.S. Cl.
  CPC .. *G06F 9/5077* (2013.01); *G06F 2009/45562* (2013.01)

(58) Field of Classification Search
  USPC .......................................................... 717/174
  See application file for complete search history.

(56) References Cited

U.S. PATENT DOCUMENTS

2012/0240135 A1    9/2012  Risbood et al.
2016/0350105 A1*  12/2016  Kumar et al. ............ G06F 8/71

* cited by examiner

DEPLOYMENT DEVICE, DEPLOYMENT METHOD, AND RECORDING MEDIUM

This application is a National Stage Entry of PCT/JP2016/003407 filed on Jul. 21, 2016, which claims priority from Japanese Patent Application 2015-147408 filed on Jul. 27, 2015, the contents of all of which are incorporated herein by reference, in their entirety.

TECHNICAL FIELD

The present invention relates to a deployment device, a deployment method and a recording medium, and in particular to a deployment device, a deployment method and a recording medium for constructing an information system.

BACKGROUND ART

Recently, in a large number of information systems (hereafter, described also as systems, simply), their configurations are managed by describing configuration information as a structured document. Particularly, for the purpose of deploying a system into a cloud infrastructure, it is widely performed to describe configuration information about constituent elements of the system, such as a VM (virtual machine) and a network, as a structured document and manage it as a configuration definition file. In that case, the configuration information is collectively described, for example, in a description syntax or format such as XML (Extensible Markup Language) and JSON (JavaScript (registered trademark) Object Notation).

Such a configuration definition file has an advantage in handling of structured documents (for example, partial cut out, copy and reuse are easy). It accordingly enables to construct a complicated information system adapted to individual requirements relatively easily by combining design patterns.

To deploy a system into an execution environment according to a configuration definition file, descriptions about deployment tools for deploying respective constituent elements are further incorporated in the configuration definition file. Such descriptions about deployment tools include, for example, those about start-up of the deployment tools, data transfer among the deployment tools and a start-up sequence of the deployment tools in accordance with dependency relationships among the constituent elements.

An example of such a deployment tool is disclosed in NPL1. In the deployment tool disclosed in NPL1, CloudFormation of Amazon Web Service (registered trademark) (hereafter, described as AWS), a deployment sequence of constituent elements is controlled by an attribute named DependsOn described in a configuration definition file. Also in other deployment tools such as Puppet and Chef, the dependency relationships and setting sequence can be controlled similarly, and these tools are widely used for deployment of various systems.

To further promote the efficiency of configuration management and deployment of a system, it is demanded to apply such a configuration definition file as described above to system deployment into a plurality of different environments.

However, it is general that a description syntax or format of such a configuration definition file is fixedly determined according to deployment tools available in an environment. Accordingly, to apply (reuse) a configuration definition file created for a certain environment to system deployment into another environment, conversion of the format of the configuration definition file is required.

For example, it is assumed that in a configuration definition file to deploy a system configured with a VM and software on the VM into an AWS environment, configuration information for the VM is described in the CloudFormation format and that for the software is described in the Cookbook format. The Cookbook format is a description format used in the above-mentioned deployment tool Chef. When deploying the same system into a Microsoft (registered trademark) Azure environment (hereafter, described as an Azure environment), it is necessary to convert the above-mentioned formats of the pieces of configuration information in the configuration definition file into formats defined by deployment tools available in the Azure environment.

CITATION LIST

Non Patent Literature

[NPL1] "AWS CloudFormation", Amazon Web Services, Inc., [online], [retrieved on Jul. 16, 2015], on the Internet <URL: http://aws.amazon.com/jp/cloudformation/>

SUMMARY OF INVENTION

Technical Problem

As described above, when deployment of a system is performed according to a configuration definition file dependent on deployment tools, such as that described in NPL1, there is an issue in that it is difficult to apply a configuration definition file created for a certain environment to system deployment into another environment.

An objective of the present invention is to provide a deployment device, a deployment method and a recording medium which can resolve the above-described issue and accordingly enable to easily apply a configuration definition file created for a certain environment to system deployment into another environment.

Solution to Problem

A deployment device according to an exemplary aspect of the present invention includes: a component information storage means for storing component information, the component information including, for each of a plurality of constituent elements constituting a system, setting information independent of deployment tools, and for each combination of one of the plurality of constituent elements and one of a plurality of deployment tools available for deploying the one of the plurality of constituent elements, a deployment process for deploying the one of the plurality of constituent elements by use of the one of the plurality of deployment tools; an identification means for identifying, for each of the plurality of constituent elements, a deployment process associated with a deployment tool designated from among the plurality of deployment tools, based on the component information; a sequence determination means for determining an execution sequence of the deployment processes identified for respective ones of the plurality of constituent elements, based on dependency relationships among the plurality of constituent elements; and a deployment execution means for deploying the plurality of constituent elements by executing the deployment processes identified for respective ones of the plurality of constituent elements in accordance with a determined execution sequence, applying the setting information for each corresponding one of the plurality of constituent elements.

A deployment method according to an exemplary aspect of the present invention includes: identifying, for each of a plurality of constituent elements constituting a system, a deployment process associated with a deployment tool designated from among a plurality of deployment tools, based on the component information, the component information including, for each of the plurality of constituent elements, setting information independent of deployment tools, and for each combination of one of the plurality of constituent elements and one of the plurality of deployment tools available for deploying the one of the plurality of constituent elements, the deployment process for deploying the one of the plurality of constituent elements by use of the one of the plurality of deployment tools; determining an execution sequence of the deployment processes identified for respective ones of the plurality of constituent elements, based on dependency relationships among the plurality of constituent elements; and deploying the plurality of constituent elements by executing the deployment processes identified for respective ones of the plurality of constituent elements in accordance with a determined execution sequence, applying the setting information for each corresponding one of the plurality of constituent elements.

A computer readable storage medium according to an exemplary aspect of the present invention records thereon a program causing a computer to perform a method comprising: identifying, for each of a plurality of constituent elements constituting a system, a deployment process associated with a deployment tool designated from among a plurality of deployment tools, based on the component information, the component information including, for each of the plurality of constituent elements, setting information independent of deployment tools, and for each combination of one of the plurality of constituent elements and one of the plurality of deployment tools available for deploying the one of the plurality of constituent elements, the deployment process for deploying the one of the plurality of constituent elements by use of the one of the plurality of deployment tools; determining an execution sequence of the deployment processes identified for respective ones of the plurality of constituent elements, based on dependency relationships among the plurality of constituent elements; and deploying the plurality of constituent elements by executing the deployment processes identified for respective ones of the plurality of constituent elements in accordance with a determined execution sequence, applying the setting information for each corresponding one of the plurality of constituent elements.

Advantageous Effects of Invention

An effect of the present invention is that a configuration definition file created for a certain environment can be easily applied to system deployment into another environment.

DESCRIPTION OF EMBODIMENTS

First Example Embodiment

A first example embodiment of the present invention will be described.

Figure 2:
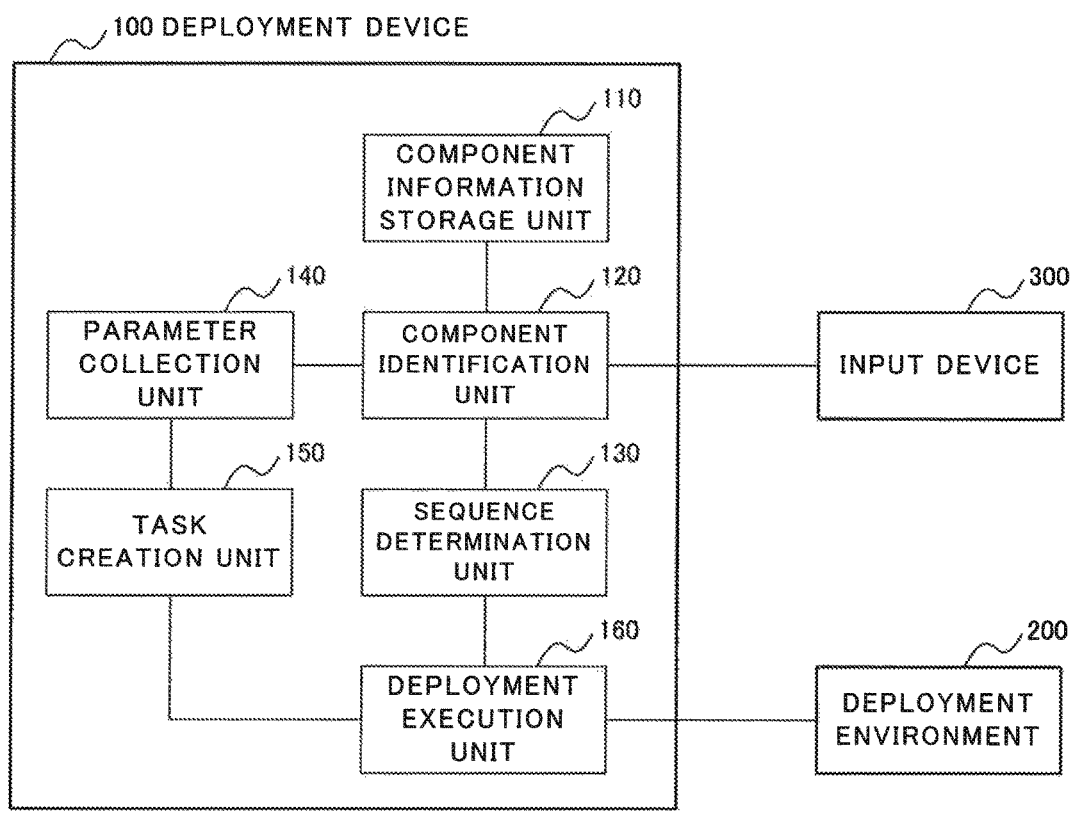
FIG. 2 is a block diagram illustrating a configuration of a deployment system in the first example embodiment of the present invention.

First, a configuration of the first example embodiment of the present invention will be described. FIG. 2 is a block diagram illustrating a configuration of a deployment system in the first example embodiment of the present invention. Referring to FIG. 2, the deployment system includes a deployment device 100, a deployment environment 200 and an input device 300. The deployment device 100 is coupled with the deployment environment 200 and the input device 300 via a network or the like. The number of deployment environments 200 thus coupled may be two or more.

The deployment device 100 deploys an information system to be constructed, into the deployment environment 200, according to a system configuration definition file (system definition) received from the input device 300.

The deployment environment 200 is an execution environment provided, for example, in the above-mentioned AWS, and includes one or more computers. The deployment environment 200 executes, on the computers, processes of a virtual machine (VM) and software modules on the VM such as an OS (Operating System), middleware and applications, which are constituent elements of the system.

The input device 300 accepts input of a system definition from a user, and transmits it to the deployment device 100.

Referring to FIG. 2, the deployment device 100 of the first example embodiment of the present invention includes a component information storage unit 110, a component identification unit 120 (or an identification unit), a sequence determination unit 130, a parameter collection unit 140, a task creation unit 150 and a deployment execution unit 160.

The component information storage unit 110 stores component information 111. In example embodiments of the present invention, as will be described below, descriptions about setting information for constituent elements of the system, about a deployment process for deploying each of the constituent elements by a deployment tool and about setting information and preprocessing for a deployment tool are each treated as a component. Here, in the example embodiments of the present invention, in addition to tools for deploying constituent elements (software modules), such as CloudFormation in AWS mentioned above, a group of operations and scripts for performing preparation and setting for use of the deployment environment 200 are also treated as deployment tools.

Figure 6:
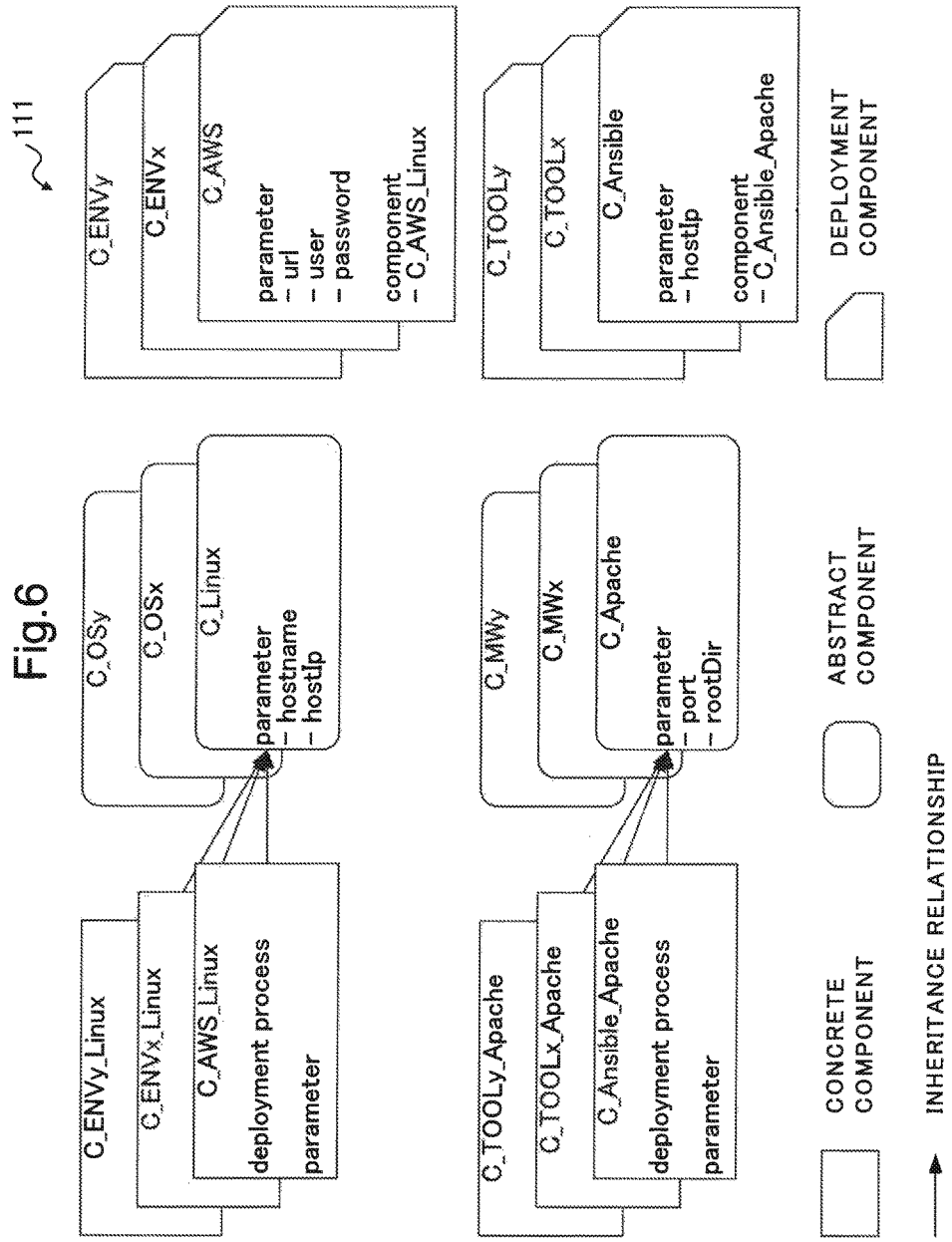
FIG. 6 is a diagram illustrating an example of component information 111 in the first example embodiment of the present invention.

FIG. 6 is a diagram illustrating an example of the component information 111 in the first example embodiment of the present invention. In the example embodiments of the present invention, an abstract component, a concrete component and a deployment component are used as the components.

The abstract component is a component in which a constituent element (software module) of the system is abstracted, and it includes the constituent element's parameters (or setting information) which are independent of deployment tools ("parameter" in FIG. 6).

The deployment component is a component corresponding to a deployment tool, and it includes the deployment tool's parameters ("parameter" in FIG. 6) and an identifier of a concrete component whose deployment process can be executed by the deployment tool ("component" in FIG. 6). The deployment component may further include descriptions (not illustrated) of preprocessing which is necessary for use of the deployment tool, such as a start-up process and health check of the deployment tool.

The concrete component is a component in which an abstract component is concreted, and it inherits parameters of the abstract component. The concrete component includes parameters dependent on a deployment tool ("parameter" in FIG. 6) and a description of a deployment process using the deployment tool ("deployment process" in FIG. 6). The concrete component is created for each abstract component, in association with each of deployment tools available for the abstract component.

In FIG. 6, each solid arrow represents an inheritance relationship where the concrete component at the origin of the arrow inherits parameter values of the abstract component at the end of the arrow.

For example, in FIG. 6, abstract components "C_Linux" and "C_Apache" are components in which the OS "Linux (registered trademark)" and the middleware "Apache (registered trademark", which are constituent elements, are respectively abstracted.

Deployment components "C_AWS" and "C_Ansible," are components corresponding to deployment tools "AWS" and "Ansible", respectively. In the deployment component "C_AWS", a concrete component "C_AWS_Linux" whose deployment process can be executed by the deployment tool "AWS" is set. In the deployment component "C_Ansible", a concrete component "C_Ansible_Apache" whose deployment process can be executed by the deployment tool "Ansible" is set.

The concrete components "C_AWS_Linux" and "C_Ansible_Apache" are components in which the abstract components "C_Linux" and "C_Apache" are respectively concreted. The concrete component "C_AWS_Linux" is a component for deploying the constituent element "Linux" by using the deployment tool "AWS". Between the concrete component "C_AWS_Linux" and the abstract component "C_Linux", there is an inheritance relationship where "C_AWS_Linux" inherits "C_Linux". This inheritance relationship means that the concrete component "C_AWS_Linux" inherits parameter values of the abstract component "C_Linux". The concrete component "C_Ansible_Apache" represents deployment of the constituent element "Apache" using the deployment tool "Ansible". Between the concrete component "C_Ansible_Apache" and the abstract component "C_Apache", there is an inheritance relationship where "C_Ansible_Apache" inherits "C_Apache". This inheritance relationship means that the concrete component "C_Ansible_Apache" inherits parameter values of the abstract component "C_Apache".

It is assumed that the above-described components have been created in advance, according to constituent elements and deployment tools available for system construction, by an administrator, a user or the like of the deployment system, and have been registered in the component information 111 in advance.

Figure 7:
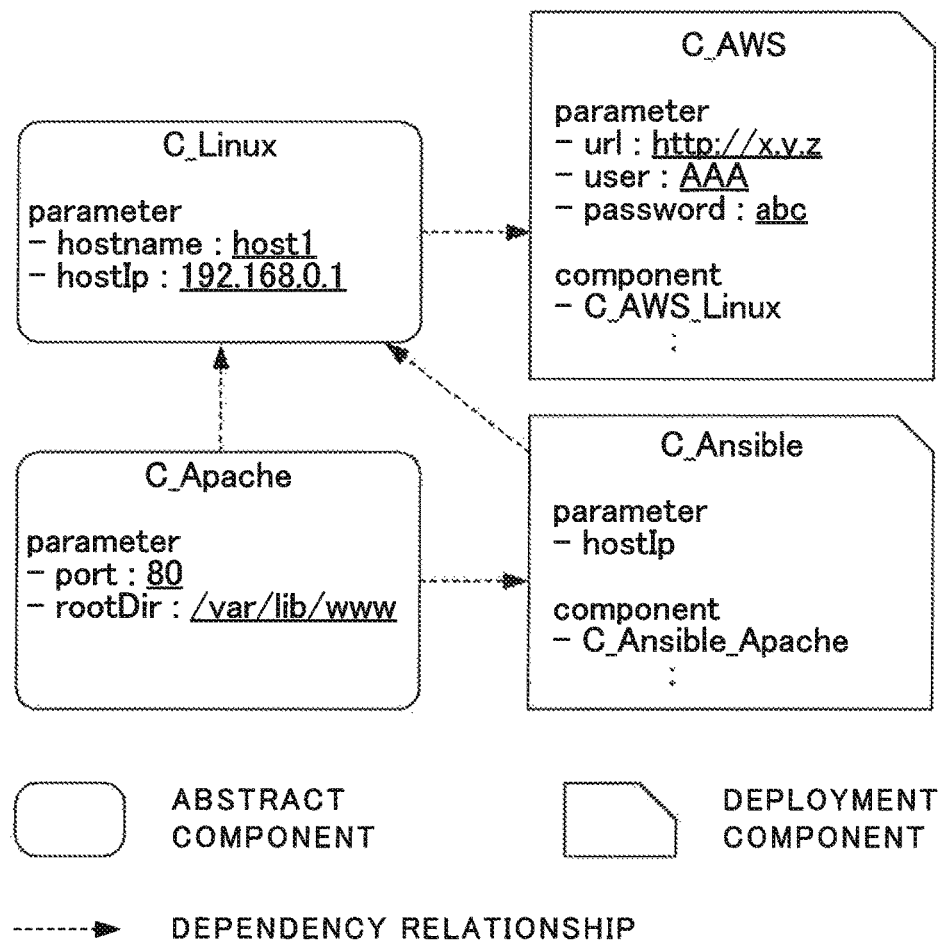
FIG. 7 is an example of a system definition in the first example embodiment of the present invention.

A user designates, as a system definition, from among the components registered in the component information 111, abstract components each corresponding to a constituent element of the system and deployment components corresponding to deployment tools for deploying the abstract components. In the system definition, the user further designates dependency relationships among the abstract components and deployment components, and also parameter values of the abstract components and of the deployment components FIG. 7 is an example of a system definition in the first example embodiment of the present invention. In FIG. 7, each dashed arrow indicates a dependency relationship between components, where the component at the origin of the arrow depends on the component at the end of the arrow.

For example, in FIG. 7, there is a dependency relationship between the abstract component "C_Apache" and the abstract component "C_Linux" where "C_Apache" depends on "C_Linux". This dependency relationship means that the constituent element "Apache" uses functions and services provided by "Linux".

There is also a dependency relationship between the abstract component "C_Linux" and the deployment component "C_AWS" where "C_Linux" depends on "C_AWS". This dependency relationship means that the constituent element "Linux" is deployed by the deployment tool "AWS". Similarly, there is a dependency relationship between the abstract component "C_Apache" and the deployment component "C_Ansible" where "C_Apache" depends on "C_Ansible". This dependency relationship means that the constituent element "Apache" is deployed by the deployment tool "Ansible".

Further, there is a dependency relationship between the deployment component "C_Ansible" and the abstract component "C_Linux" where "C_Ansible" depends on "C_Linux". This dependency relationship means that the constituent element "Ansible" uses functions and services provided by "Linux".

The component identification unit 120 identifies, from among the concrete components included in the component information 111, concrete components associated with the abstract components and deployment components designated as the system definition.

The parameter collection unit 140 determines parameter values of each of the concrete components, by referring to parameter values of an abstract component to be inherited and parameter values of a deployment component associated with the concrete component.

The task creation unit 150 creates tasks for executing a deployment process described in each of the deployment components and preprocessing described in the concrete components.

The sequence determination unit 130 determines an execution sequence of the tasks created in association with the deployment components and concrete components, according to dependency relationships among the abstract components and deployment components.

The deployment execution unit 160 executes the created tasks according to the determined execution sequence, thereby deploying the constituent elements of the system and accordingly constructing the system.

Here, the deployment device 100 may be a computer which includes a CPU (Central Processing Unit) and a recording medium storing a program and operates by control based on the program.

Figure 3:
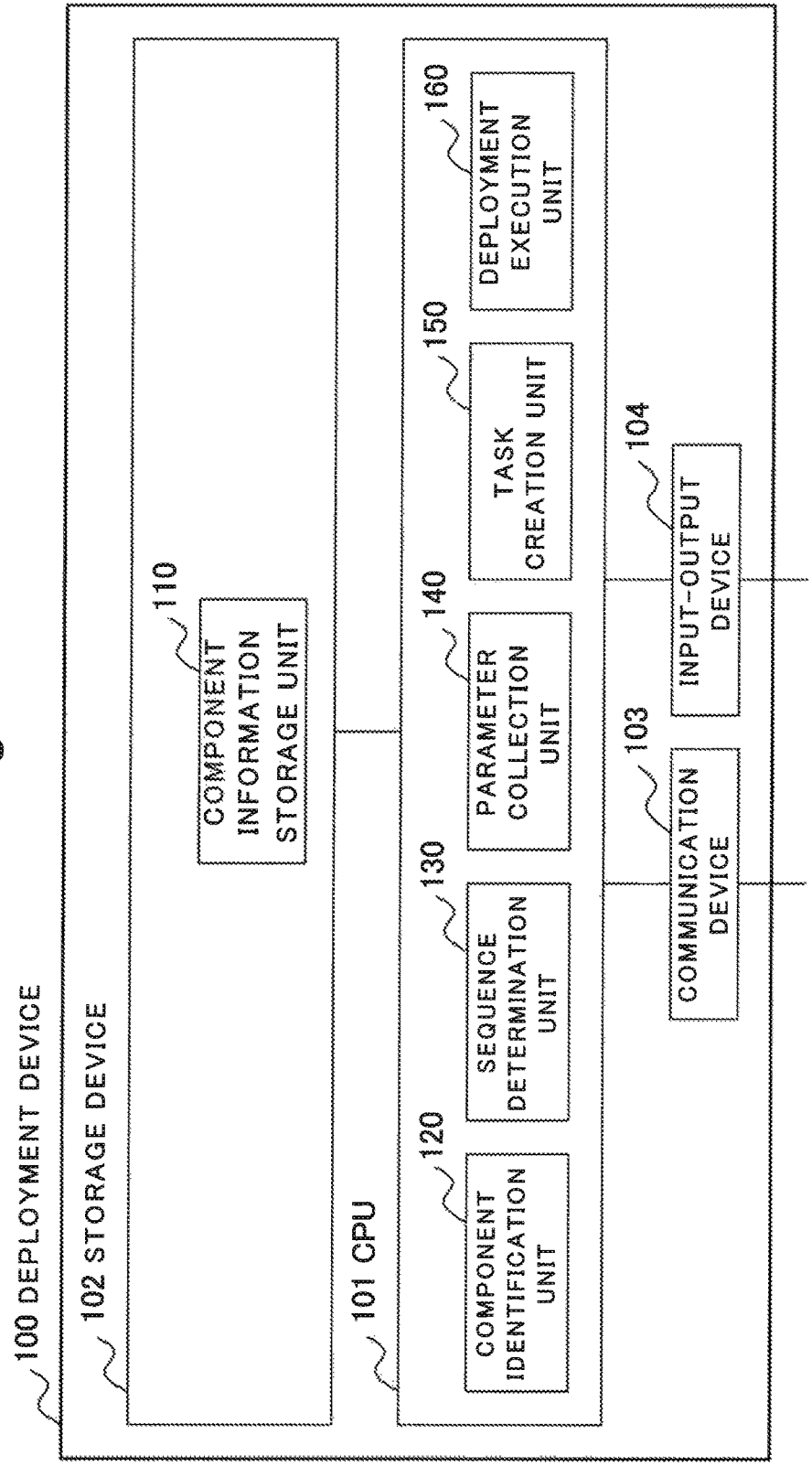
FIG. 3 is a block diagram illustrating a configuration of a deployment device 100 implemented by a computer, in the first example embodiment of the present invention.

FIG. 3 is a block diagram illustrating a configuration of the deployment device 100 implemented by a computer, in the first example embodiment of the present invention.

In that case, the deployment device 100 includes a CPU 101, a storage device 102 (a recording medium) such as a hard disk or a memory, a communication device 103 communicating with other devices or the like, an input-output device 104 such as a keyboard or a display. The CPU 101 executes a computer program for implementing the component identification unit 120, the sequence determination unit 130, the parameter collection unit 140, the task creation unit 150 and the deployment execution unit 160. The storage device 102 stores data to be stored in the component information storage unit 110. The communication device 103 receives a system definition from the input device 300. The communication device 103 also transmits a deployment request to the deployment environment 200. The input-output device 104 performs input of the component information 111, various settings about the deployment device 100, and the like from an administrator, a user or the like, and also performs output to the administrator, user or the like.

Alternatively, each of the constituent elements of the deployment device 100 may be an independent logical circuit.

Further, the constituent elements of the deployment device 100 may be disposed dispersedly in different devices which are coupled with each other by wired or wireless means.

Figure 4:
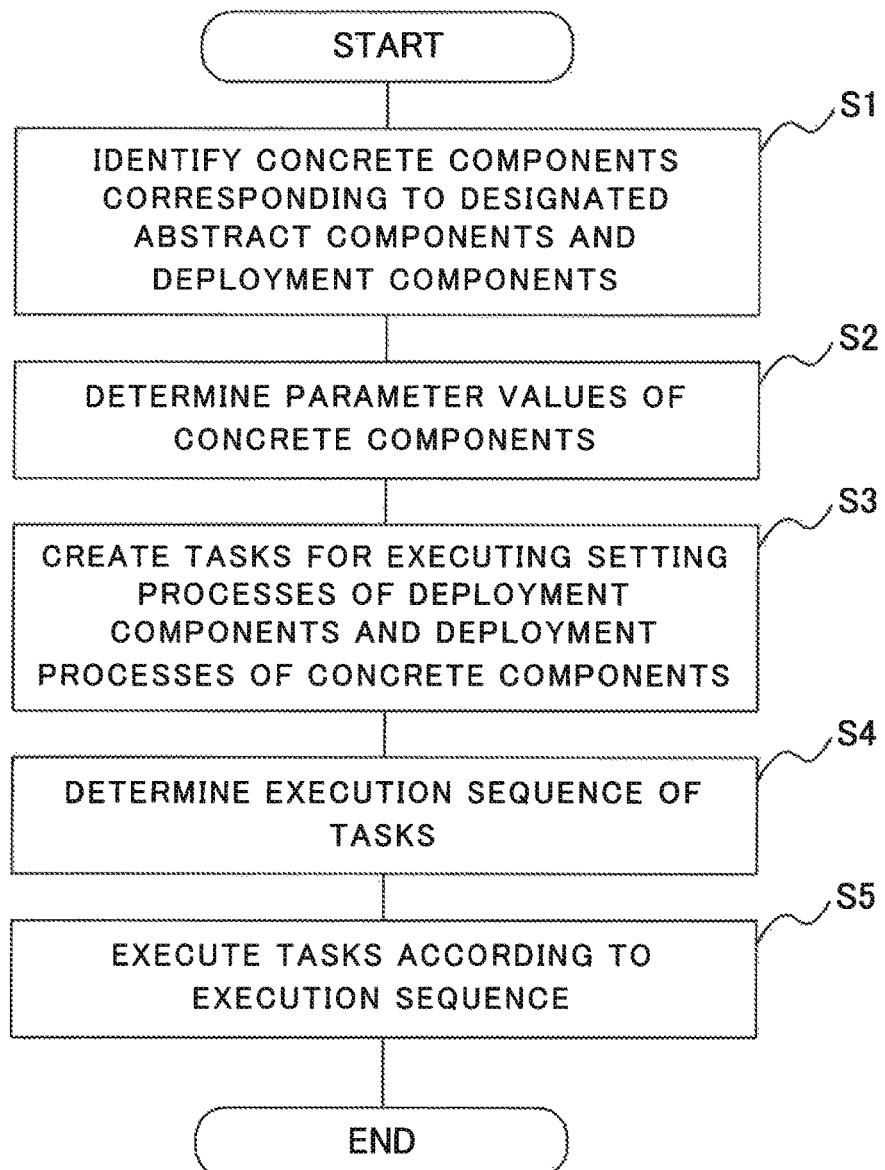
FIG. 4 is a flow chart illustrating operation of the deployment device 100 in the first example embodiment of the present invention.

Next, operation of the first example embodiment of the present invention will be described. FIG. 4 is a flow chart illustrating operation of the deployment device 100 in the first example embodiment of the present invention.

Here, it is assumed that the component information 111 illustrated in FIG. 6 is stored in the component information storage unit 110, and that the system definition illustrated in FIG. 7 has been input, as a system definition of a system to be constructed, from a user.

First, the component identification unit 120 identifies concrete components associated with abstract components and deployment components designated by the system definition (step S1).

Here, the component identification unit 120 identifies, from the component information 111, a concrete component which inherits a corresponding one of the designated abstract components and whose identifier is set in a deployment component the abstract component depends on.

Figure 8:
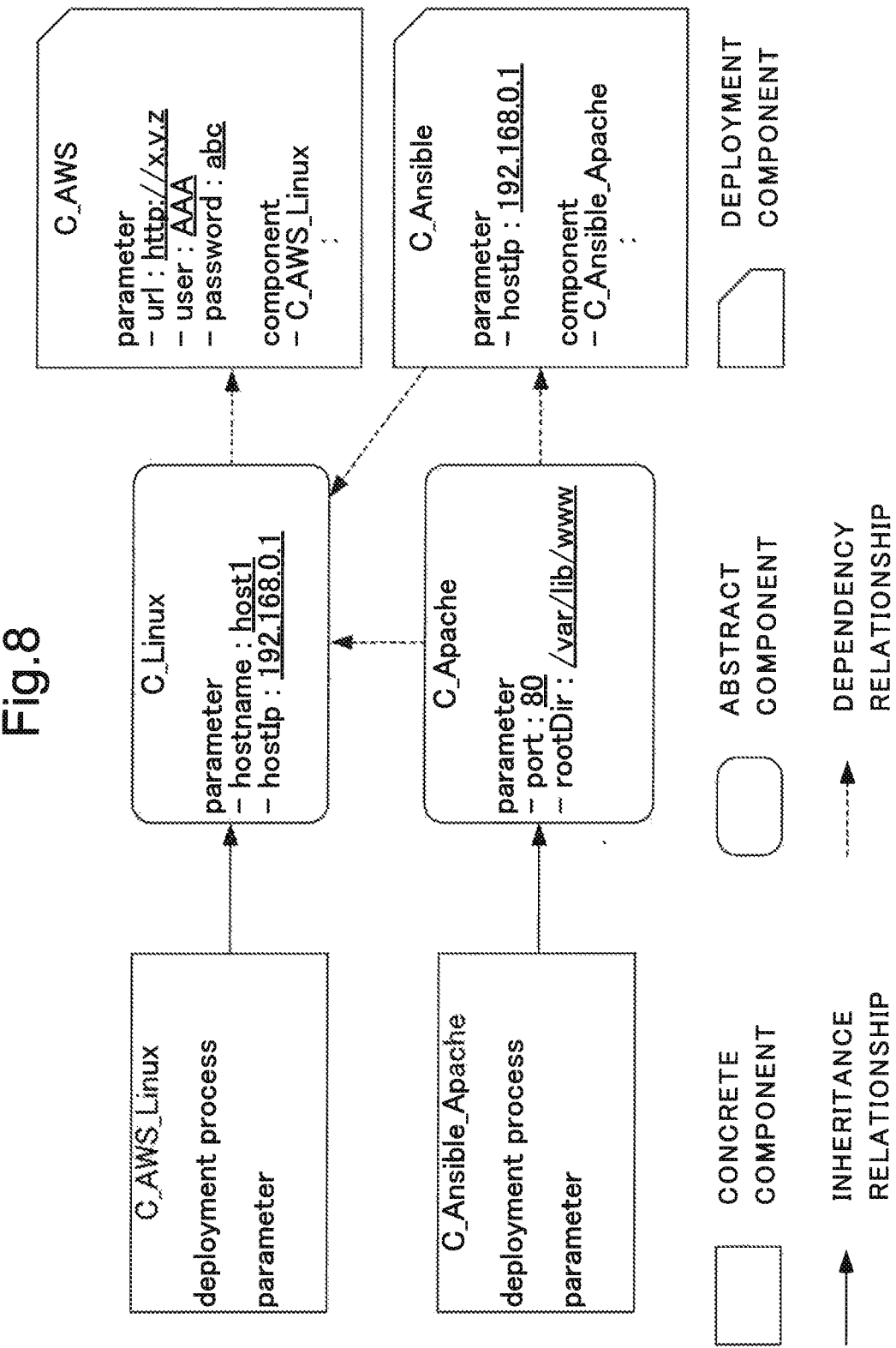
FIG. 8 is a diagram illustrating an example of concrete component identification in the first example embodiment of the present invention.

FIG. 8 is a diagram illustrating an example of the concrete component identification in the first example embodiment of the present invention.

For example, as illustrated in FIG. 8, the component identification unit 120 identifies the concrete component "C_AWS_Linux" which inherits the abstract component "C_Linux" and is set in the deployment component "C_AWS" on which "C_Linux" depends. The component identification unit 120 also identifies the concrete component "C_Ansible_Apache" which inherits the abstract component "C_Apache" and is set in the deployment component "C_Ansible" on which "C_Apache" depends.

Next, the parameter collection unit 140 determines parameter values of the identified concrete components (step S2).

Figure 9:
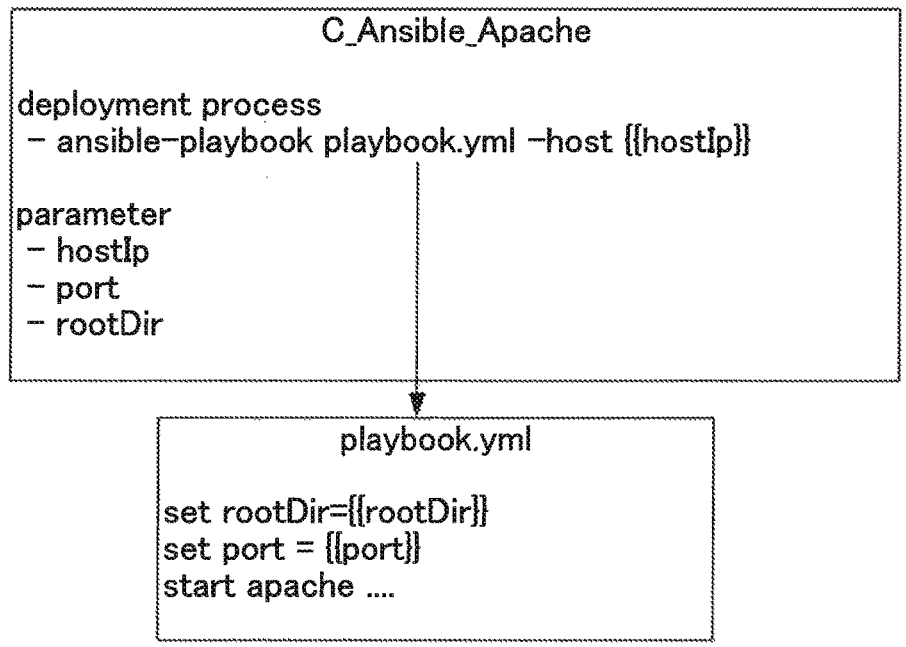
FIG. 9 is a diagram illustrating details of a concrete component in the first example embodiment of the present invention.

FIG. 9 is a diagram illustrating details of a concrete component in the first example embodiment of the present invention. In the concrete component, a character string of an operation (command) for deploying a constituent element defined by a deployment tool is described, as a deployment process. Here, as the command, an HTTP (Hypertext Transfer Protocol) request and file transfer by FTP (File Transfer Protocol) may be designated.

The character string of a command includes a variable character string representing a parameter name. In the example of FIG. 9, a variable character string "{{hostIp}}" is included in the command of the concrete component "C_Ansible_Apache". Further, in an external file which is referred to within the command, a variable character string may be included. In the example of FIG. 9, variable character strings "{{rootDir}}" and "{{port} }" are included in an external file "playbook.yml" referred to within the command. When an HTTP request is designated as the command, a variable character string may be included in a structured file, such as of the JSON format, attached to the HTTP request.

Further, in the concrete component, as its parameters, the above-described parameters designated as variable character strings are indicated. In the example of FIG. 9, the parameters "hostIp", "rootDir" and "port", which are designated in the command and the external file, are indicated.

The parameter collection unit 140 acquires a value for each of the parameters, by referring to a value of a parameter which is with the same name (character string) and included in an abstract component inherited by the concrete component or in another component on which the abstract component depends. Then, with the acquired values, the parameter collection unit 140 replaces the respectively corresponding variable character strings in the command and the external file.

Figure 10:
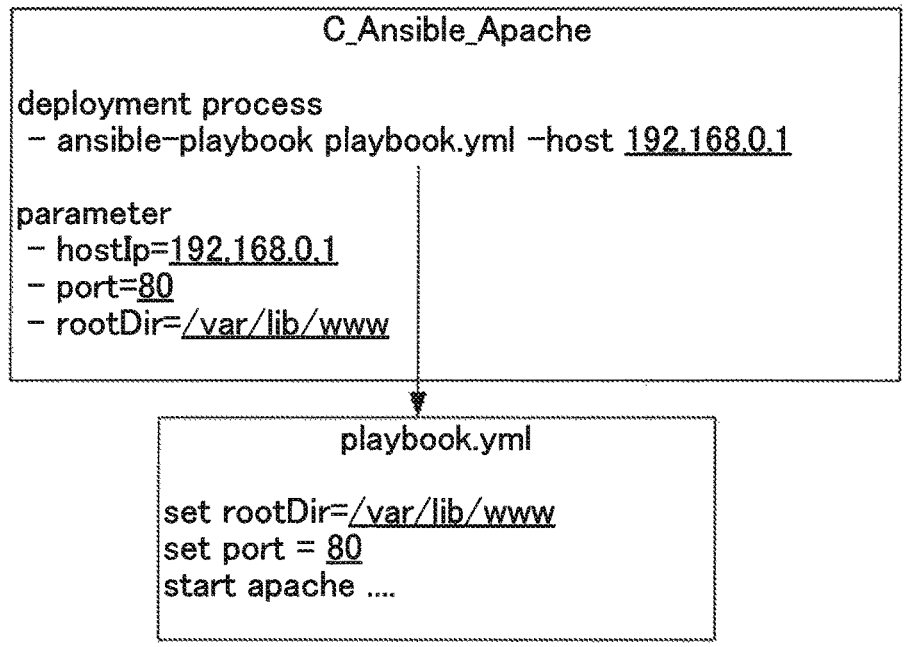
FIG. 10 is a diagram illustrating details of the concrete component after parameter collection, in the first example embodiment of present invention.

FIG. 10 is a diagram illustrating details of a concrete component after the parameter collection, in the first example embodiment of present invention. For example, as illustrated in FIG. 10, the parameter collection unit 140 replaces the variable character string "{{hostIp}}" of the command in the concrete component "C_Ansible_Apache" with a value "192.168.0.1" of the parameter "hostIp" designated in the abstract component "C_Linux". Further, the parameter collection unit 140 replaces the variable character strings "{{rootDir} }" and "{{port} }" in the external file "playbook.yml" with, respectively, a value "/var/lib/www" of the parameter "rootDir" and a value "80" of the parameter "port" which are designated in the abstract component "C_Apache".

Also for the concrete component "C_AWS_Linux", the parameter collection unit 140 similarly acquires values for parameters each designated as a variable character string, from values of parameters in the abstract component "C_Linux" and in another component.

Here, also for preprocessing of a deployment component, the parameter collection unit 140 may similarly acquire a value for a parameter defined as a variable character string of a command, from another component.

Next, the task creation unit 150 creates a task for executing preprocessing described in each deployment component and that for executing a deployment process described in each concrete component (step S3).

Here, in association with preprocessing described in each deployment component and with a deployment process described in each concrete component, the task creation unit 150 creates a task for executing a command in which parameter values are incorporated. The task creation unit 150 transfers a list of the created tasks (task list) to the deployment execution unit 160.

For example, the task creation unit 150 creates a task for executing a command of FIG. 10 for the concrete component "C_Ansible_Apache". Similarly, the task creation unit 150 creates a task also for the concrete component "C_AWS_Linux" and for each of the deployment components "C_Ansible" and "C_AWS".

Next, the sequence determination unit 130 determines an execution sequence of the tasks created for the deployment components and concrete components (step S4).

Here, based on dependency relationships among the deployment components and the abstract components inherited by the concrete components, the sequence determination unit 130 determines the execution sequence of the tasks for the deployment components and concrete components. It is assumed here that a system definition input from a user is set such that dependency relationships among the components do not become cyclic. In that case, the system definition can be considered to be a directed acyclic graph including the components as its nodes and the dependency relationships as its edges. Generally, sequencing of a directed acyclic graph can be achieved by performing topological sorting, and a sequence thus determined can be used as an execution sequence of the tasks. While some number of algorithms for topological sorting of a directed acyclic graph have been proposed, there is no restriction on an algorithm to use in the example embodiments of the present invention. The sequence determination unit 130 transfers a result of the topological sorting to the deployment execution unit 160.

Figure 11:
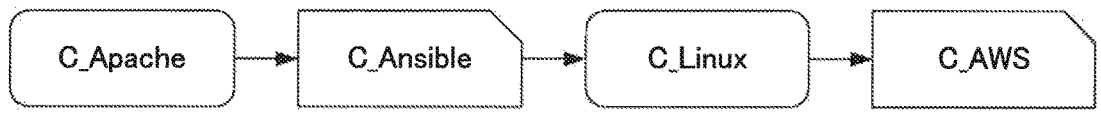
FIG. 11 is a diagram illustrating an example of a result of topological sorting in the first example embodiment of the present invention.

FIG. 11 is a diagram illustrating an example of a result of the topological sorting in the first example embodiment of the present invention. For example, the sequence determination unit 130 performs the topological sorting on the deployment components and abstract components designated by the system definition of FIG. 7, according to their dependency relationships, as illustrated in FIG. 11. As the result of the topological sorting is in accordance with the dependency relationships, the actual execution sequence of the tasks becomes a reverse sequence to the topological sorting result.

Next, the deployment execution unit 160 executes the tasks according to the determined execution sequence, thereby deploying the constituent elements of the system (step S5).

Here, the deployment execution unit 160 sequentially executes the tasks created for the deployment components and for the concrete components associated with the respective abstract components in a reverse sequence to the topological sorting result.

Figure 5:
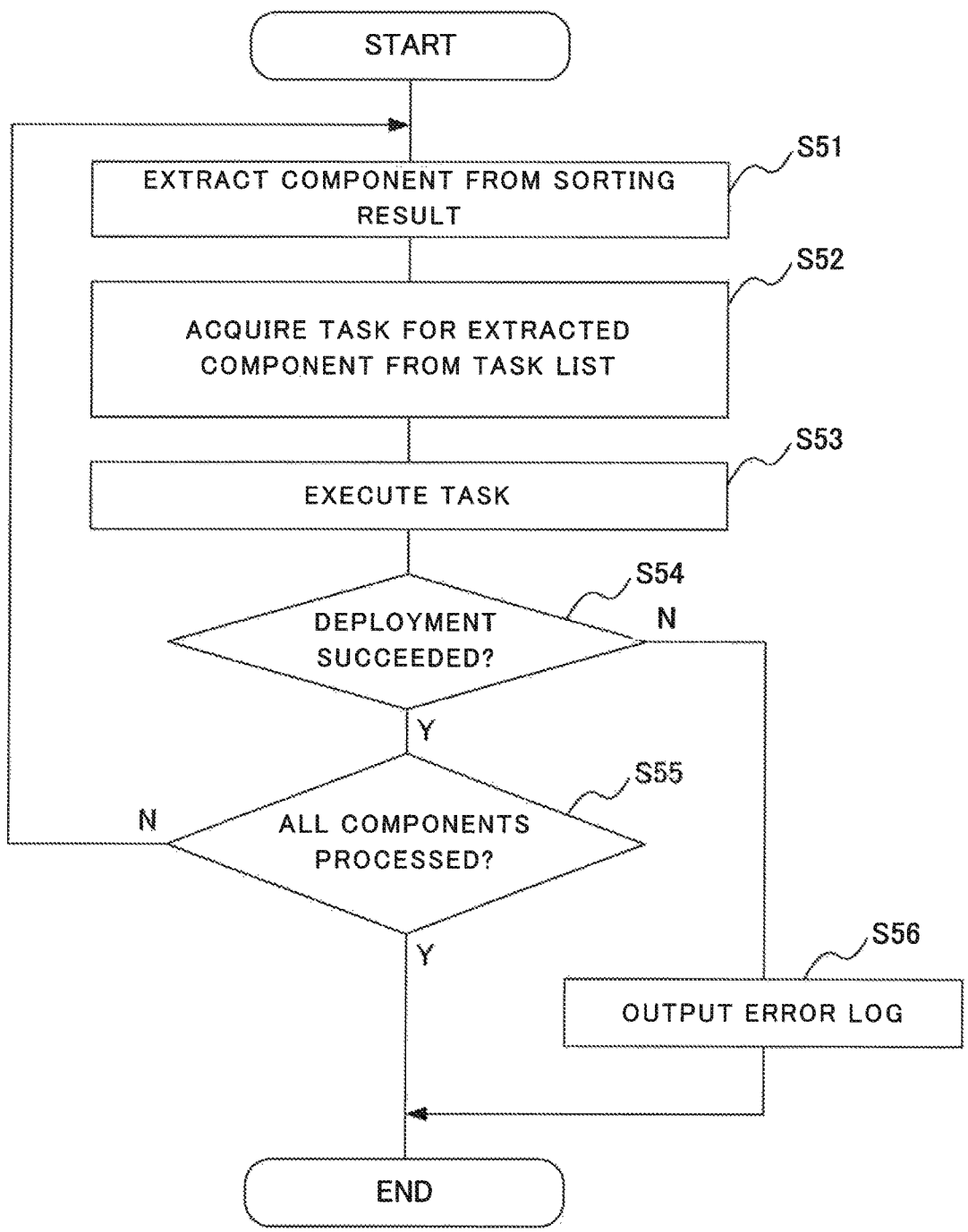
FIG. 5 is a flow chart illustrating details of a task execution process (step S5) in the first example embodiment of the present invention.

FIG. 5 is a flow chart illustrating details of the task execution process (step S5) in the first example embodiment of the present invention.

The deployment execution unit 160 sequentially extracts one of the components (nodes) included in the topological sorting result acquired from the sequence determination unit 130, in order from the last to the first (step S51). The deployment execution unit 160 acquires a task for the component extracted from the task list acquired from the task creation unit 150 (step S52). The deployment execution unit 160 executes the acquired task and checks a deployment result received from the deployment tool (step S53). When the deployment result indicates failure (step S54/N), the deployment execution unit 160 outputs an error log (step S56) and ends the task execution process. When the deployment result indicates success (step S54/Y), the deployment execution unit 160 repeats the steps S51 to S54 until the process is completed on all of the components (nodes) included in the topological sorting result (step S55).

For example, the deployment execution unit 160 executes a task created for the deployment component "C_AWS", according to the topological sorting result illustrated in FIG. 11, and accordingly logs in to a service of AWS, which is the deployment environment 200, as preprocessing of the deployment tool "AWS". Next, the deployment execution unit 160 executes a task for the concrete component "C_AWS_Linux" and accordingly deploys a virtual machine of the OS "Linux" as a deployment process using the deployment tool "AWS". In the OS "Linux", parameters hostname "HOST1" and hostIp "192.168.0.1" are set. Next, the deployment execution unit 160 executes a task for the deployment component "C_Ansible" and accordingly starts up the deployment tool "Ansible" on the OS "Linux", as preprocessing of the deployment tool "Ansible". Finally, the deployment execution unit 160 executes a task for the concrete component "C_Ansible_Apache" and accordingly deploys the middleware "Apache", as a deployment process using the deployment tool "Ansible". In the middleware "Apache", parameters hostIp "192.168.0.1", rootDir "/var/lib/www" and port "80" are set.

Thus, the operation of the first example embodiment of the present invention is completed.

Figure 1:
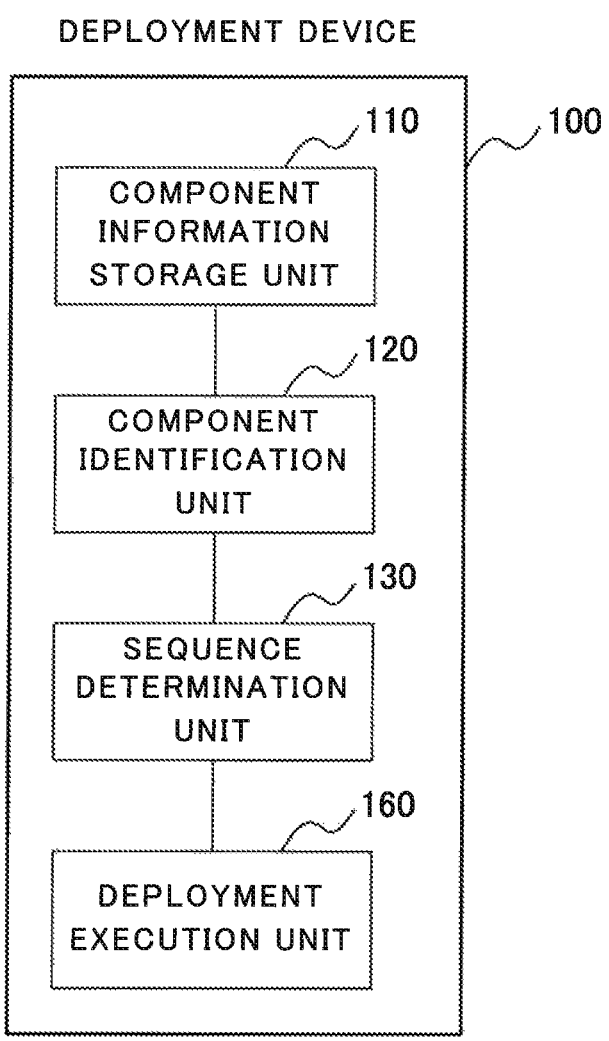
FIG. 1 is a block diagram illustrating a characteristic configuration of a first example embodiment of the present invention.

Next, a characteristic configuration of the first example embodiment of the present invention will be described. FIG. 1 is a block diagram illustrating a characteristic configuration of the first example embodiment of the present invention.

Referring to FIG. 1, a deployment device 100 includes a component information storage unit 110, a component identification unit 120 (an identification unit), a sequence determination unit 130 and a deployment execution unit 160.

The component information storage unit 110 stores component information 111. The component information 111 includes, for each of a plurality of constituent elements to constitute a system, setting information independent of deployment tools. The component information 111 further includes, for each of the plurality of constituent elements to constitute a system, in association with each combination of the constituent element and one of a plurality of deployment tools available for deploying the constituent element, a deployment process for deploying the constituent element by the use of the deployment tool.

The component identification unit 120 identifies, for each of the plurality of constituent elements, a deployment process associated with a designated one of the plurality of deployment tools, based on the component information 111.

The sequence determination unit 130 determines an execution sequence of the deployment processes identified for respective ones of the plurality of constituent elements, according to dependency relationships among the plurality of constituent elements.

The deployment execution unit 160 executes the deployment processes identified for respective ones of the plurality of constituent elements, according to the determined execution sequence and applying setting information for a corresponding one of the constituent elements, and thereby deploys the plurality of constituent elements.

Next, an advantageous effect of the first example embodiment of the present invention will be described.

According to the first example embodiment of the present invention, when deploying a system using deployment tools in accordance with a configuration definition file, a configuration definition file of a system created for a certain environment can be easily applied to system deployment into another environment. It is because the deployment device 100 identifies deployment processes associated with designated deployment tools, determines an execution sequence of the identified deployment processes, based on dependency relationships among constituent elements, and executes the identified deployment processes according to the determined execution sequence and applying setting information for the constituent elements.

It accordingly is possible to deploy the same system into different environments by only defining, as a configuration definition file, dependency relationships among constituent elements of the system and setting information for the constituent elements and by designating deployment tools in accordance with an environment.

As already described, when deploying a system according to a configuration definition file dependent on deployment tools, such as that described in NPL1, descriptions associated with deployment tools include descriptions of a start-up sequence of (dependency relationships among) the deployment tools, data linkage among them and the like. Accordingly, when there occurs change in a combination of deployment tools in a system even if no change occurs in the system's deployment destination environment and constituent elements, it is necessary to revise descriptions associated with a changed deployment tool and with a deployment tool having a dependency relationship with the changed deployment tool.

For example, it is assumed that the deployment tool combination of CloudFormation and Chef, described earlier, is changed to a combination of CloudFormation and Puppet. In that case, as CloudFormation started up Chef, which is subjected to the change, descriptions associated with Cloud-Formation need to be revised even though there is no change in system configuration.

According to the first example embodiment of the present invention, change of descriptions in a configuration definition file can be suppressed even when a deployment tool combination is changed. It is because the sequence determination unit 130 determines an execution sequence of deployment processes identified for respective constituent elements, based on dependency relationships among the constituent elements, and the deployment execution unit 160 executes the deployment processes according to the determined execution sequence. Accordingly, it is not necessary to describe, in descriptions associated with deployment tools, a start-up sequence of (dependency relationships among) the deployment tools, and revision of the descriptions is not needed even when a deployment tool combination is changed.

Second Example Embodiment

Next, a second example embodiment of the present invention will be described. The second example embodiment of the present invention is different from the first example embodiment in that after input of a system definition, instead of immediately deploying the system, information necessary for the deployment is provided to a user, and the deployment is accordingly performed in an interactive manner.

Figure 12:
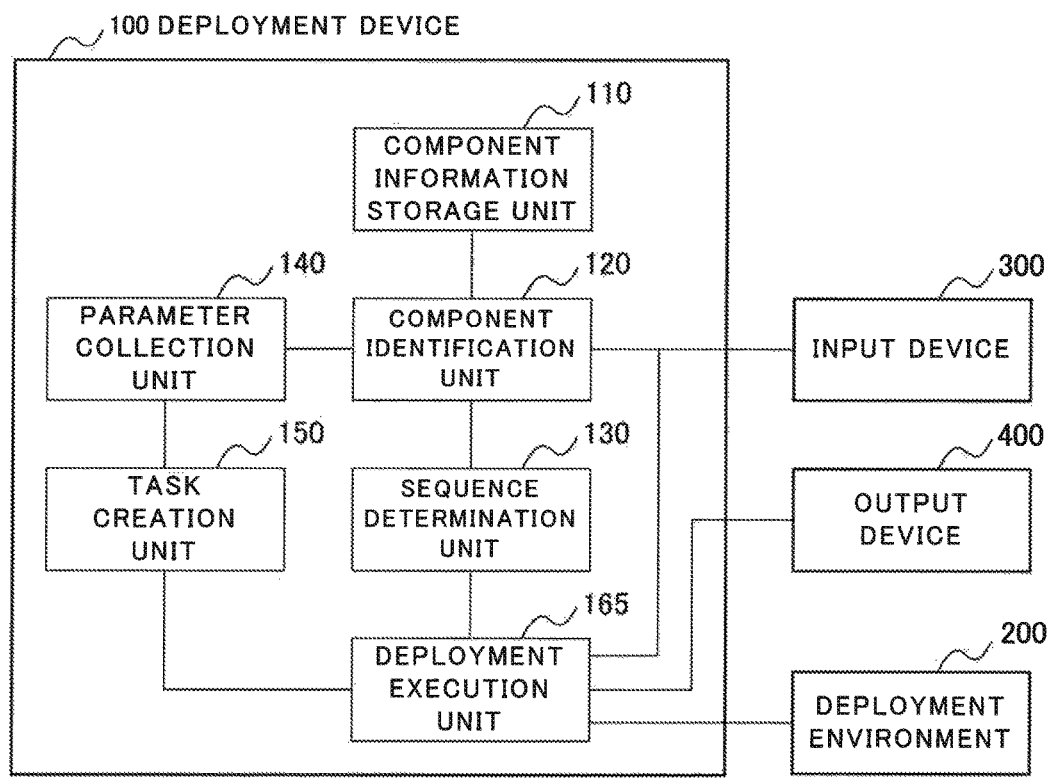
FIG. 12 is a block diagram illustrating a configuration of a deployment system in a second example embodiment of the present invention.

FIG. 12 is a block diagram illustrating a configuration of a deployment system in the second example embodiment of the present invention.

Referring to FIG. 12, in the deployment system of the second example embodiment of the present invention, the deployment execution unit 160 of the deployment device 100 is replaced by a deployment execution unit 165, and an output device 400 is added.

Before executing deployment processes, the deployment execution unit 165 outputs (displays) a deployment execution plan to a user via the output device 400.

Figure 13:
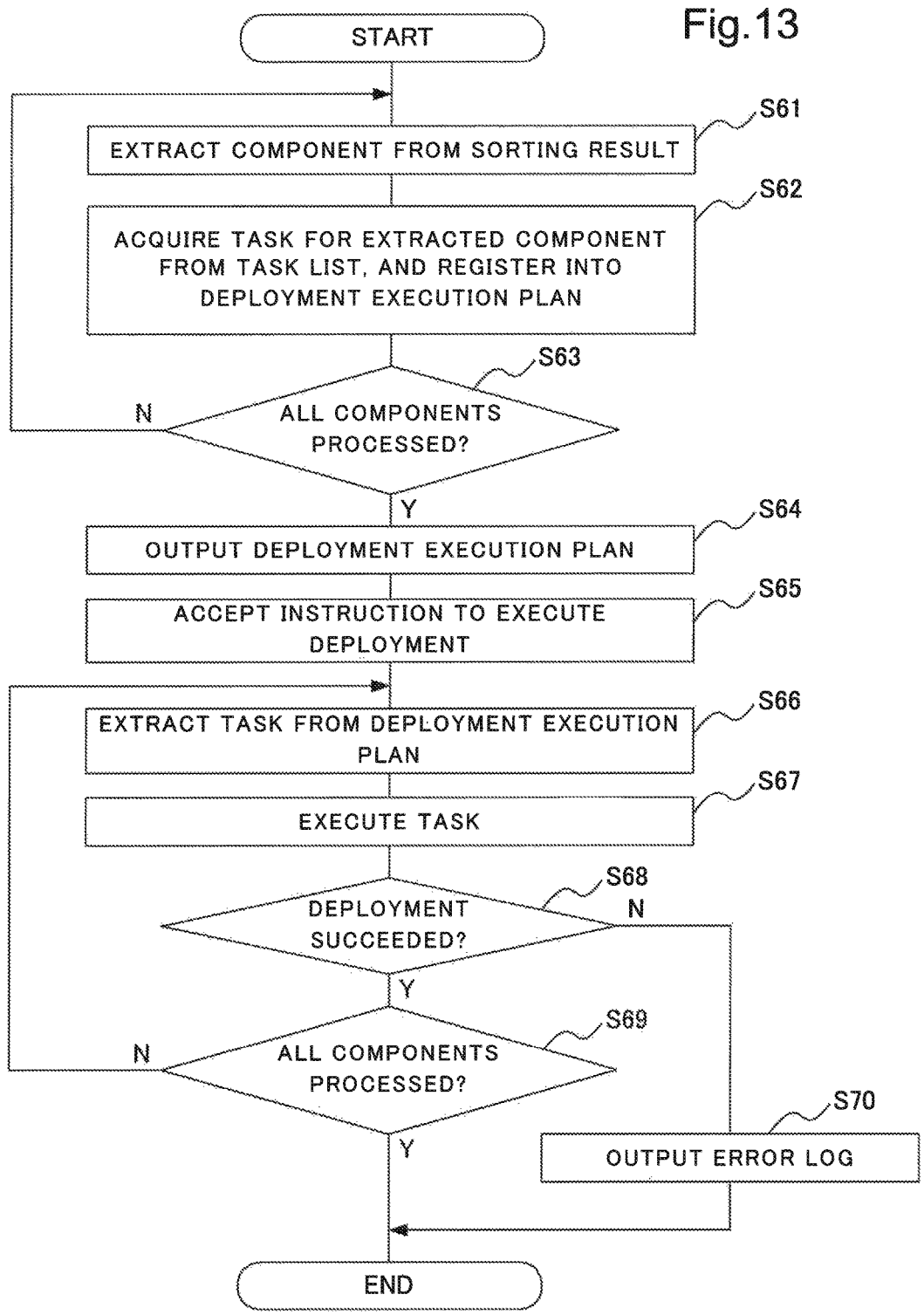
FIG. 13 is a flow chart illustrating details of a task execution process (step S5) in the second example embodiment of the present invention.

FIG. 13 is a flow chart illustrating details of a task execution process (step S5) in the second example embodiment of the present invention.

The deployment execution unit 165 sequentially extracts one of components (nodes) in a topological sorting result acquired from the sequence determination unit 130, in order from the last to the first (step S61). The deployment execution unit 165 extracts, from a task list acquired from the task creation unit 150, a task for the extracted component, and registers the task into a deployment execution plan according to the order (step S62). The deployment execution unit 165 repeats the steps S61 and S62 until the process is completed on all components (nodes) included in the topological sorting result (step S63). The deployment execution unit 165 outputs (displays) the deployment execution plan to a user via the output device 400 (step S64).

Figure 14:
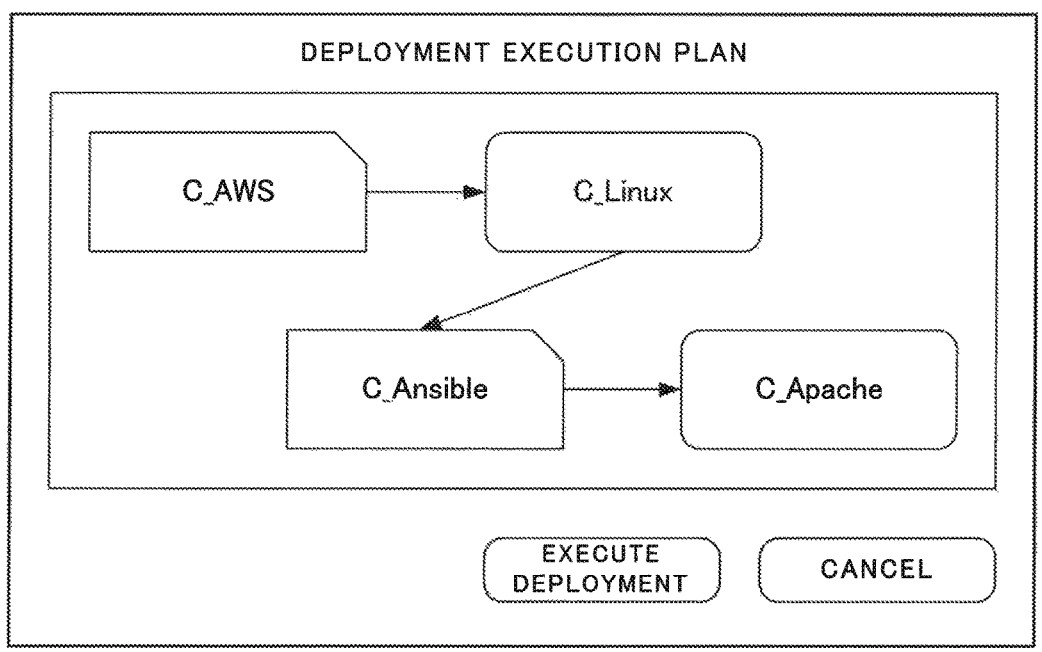
FIG. 14 is a diagram illustrating an example of an output screen of a deployment execution plan, in the second example embodiment of the present invention.

FIG. 14 is a diagram illustrating an example of an output screen of a deployment execution plan in the second example embodiment of the present invention. In the example of FIG. 14, as a deployment execution plan, deployment components and abstract components associated with concrete components are displayed in order of execution of corresponding tasks. For example, the deployment execution unit 165 displays the output screen of FIG. 14. Here, the deployment execution unit 165 may display concrete components instead of abstract components. The deployment execution unit 165 may further display, as a deployment execution plan, parameter values of each component, and content of deployment processes and of preprocessing.

When determining that the output deployment execution plan has no problem, the user instructs to execute the deployment.

The deployment execution unit 165 accepts the instruction to execute the deployment from the user via the input device 300 (step S65). The deployment execution unit 165 extracts one task from the deployment execution plan, in order from the top to the bottom (step S66). The deployment execution unit 165 executes the extracted task and checks a deployment result received from the deployment tool (step S67). When the deployment result indicates failure (step S68/N), the deployment execution unit 165 outputs an error log (step S70) and ends the task execution process. When the deployment result indicates success (step S68/Y), the deployment execution unit 165 repeats the steps S66 to S68 until all tasks included in the deployment execution plan are executed (step S69).

Thus, the operation in the second example embodiment of the present invention is completed.

Next, an advantageous effect of the second example embodiment of the present invention will be described.

According to the second example embodiment of the present invention, it is possible to find and correct a defect in a system definition, such as an input error and omission of a requirement, before executing system deployment. It is because the deployment execution unit 165 outputs a deployment execution plan representing an execution sequence of deployment processes associated with respective constituent elements and, when an instruction to execute the deployment is input in response to output of the deployment execution plan, executes the deployment processes according to the execution sequence having been determined.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-147408, filed on Jul. 27, 2015, the disclosure of which is incorporated herein in its entirety by reference.

INDUSTRIAL APPLICABILITY

The present invention is widely applicable to editing tools for editing a configuration definition file of an information system. Further, the present invention is also widely applicable to system deployment tools for deploying constituent elements of an information system, such as applications and servers, in combination into an execution environment.

REFERENCE SIGNS LIST 100 deployment device
101 CPU
102 storage device
103 communication device
104 input-output device
110 component information storage unit
111 component information
120 component identification unit
130 sequence determination unit
140 parameter collection unit
150 task creation unit
160 deployment execution unit
165 deployment execution unit
200 deployment environment
300 input device

What is claimed is:

1. A deployment device comprising:
a memory storing instructions; and
one or more processors configured to execute the instructions to:
store component information, the component information including,
in association with each of a plurality of constituent elements constituting a system, setting information independent of deployment tools respectively used for deploying the plurality of constituent elements into an execution environment according to a configuration definition file with which setting sequence of the plurality of constituent elements is controllable, and
in association with each combination of each of the plurality of constituent elements and each of a plurality of deployment tools available for deploying corresponding one of the plurality of constituent elements, a character string describing a command representing a deployment process for deploying the corresponding one of the plurality of constituent elements by use of corresponding one of the plurality of deployment tools;
identify, for each of the plurality of constituent elements, a deployment process associated with a combination of corresponding one of the plurality of constituent elements and a deployment tool designated from among the plurality of deployment tools, based on the component information;
determine an execution sequence of the deployment processes identified for respective ones of the plurality of constituent elements, based on dependency relationships among the plurality of constituent elements; and
deploy each of the plurality of constituent elements by executing the deployment process identified for corresponding one of the plurality of constituent elements in accordance with the determined execution sequence, applying the setting information for the corresponding one of the plurality of constituent elements.

2. The deployment device according to claim 1, wherein the component information further includes preprocessing of each of the plurality of deployment tools;
an execution sequence of the deployment processes identified for respective ones of the plurality of constituent elements and preprocessing of designated deployment tools is determined, based on dependency relationships among the plurality of constituent elements and the plurality of deployment tools; and
the deployment processes identified for respective ones of the plurality of constituent elements and preprocessing of designated deployment tools are executed, according to a determined execution sequence.

3. The deployment device according to claim 2, wherein the component information includes abstract components each representing the setting information for a corresponding one of the plurality of constituent elements, concrete components each representing the deployment process associated with a corresponding one of the combinations of one of the plurality of constituent elements and one of the plurality of deployment tools, and deployment components each representing preprocessing of a corresponding one of the plurality of deployment tools;
the constituent elements and the deployment processes for deploying the constituent elements are represented by inheritance relationships between the abstract components and the concrete components, and dependency relationships among the plurality of constituent elements and the plurality of deployment tools are represented by dependency relationships among the plurality of abstract components and the plurality of deployment components;
deployment processes associated with designated deployment tools among the plurality of deployment tools are identified, based on the inheritance relationships between the abstract components and the concrete components; and an execution sequence of the deployment processes identified for respective ones of the plurality of constituent elements and preprocessing of designated deployment tools is determined, based on the dependency relationships among the plurality of abstract components and the plurality of deployment components.

4. The deployment device according to claim 1, wherein the determined execution sequence is output and, when an instruction to execute the deployment is input in response to the output of the execution sequence, the deployment processes identified for respective ones of the plurality of constituent elements are executed, according to the determined execution sequence.

5. A deployment method comprising:

storing, in association with each of a plurality of constituent elements constituting a system, setting information independent of deployment tools respectively used for deploying the plurality of constituent elements into an execution environment according to a configuration definition file with which setting sequence of the plurality of constituent elements is controllable;

storing, in association with each combination of each of the plurality of constituent elements and each of a plurality of deployment tools available for deploying corresponding one of the plurality of constituent elements, setting a character string describing a command representing a deployment process for deploying the corresponding one of the plurality of constituent elements by use of corresponding one of the plurality of deployment tools;

identifying, for each of the plurality of constituent elements, a deployment process associated with a combination of corresponding one of the plurality of constituent elements and a deployment tool designated from among the plurality of deployment tools, based on the component information;

determining an execution sequence of the deployment processes identified for respective ones of the plurality of constituent elements, based on dependency relationships among the plurality of constituent elements; and deploying each of the plurality of constituent elements by executing the deployment process identified for corresponding one of the plurality of constituent elements in accordance with the determined execution sequence, applying the setting information for the corresponding one of the plurality of constituent elements.

6. The deployment method according to claim 5, wherein the component information further includes preprocessing of each of the plurality of deployment tools;

an execution sequence of the deployment processes identified for respective ones of the plurality of constituent elements and preprocessing of designated deployment tools is determined, based on dependency relationships among the plurality of constituent elements and the plurality of deployment tools; and the deployment processes identified for respective ones of the plurality of constituent elements and preprocessing of designated deployment tools are executed, according to a determined execution sequence.

7. The deployment method according to claim 6, wherein the component information includes abstract components each representing the setting information for a corresponding one of the plurality of constituent elements, concrete components each representing the deployment process associated with a corresponding one of the combinations of one of the plurality of constituent elements and one of the plurality of deployment tools, and deployment components each representing preprocessing of a corresponding one of the plurality of deployment tools;

the constituent elements and the deployment processes for deploying the constituent elements are represented by inheritance relationships between the abstract components and the concrete components, and dependency relationships among the plurality of constituent elements and the plurality of deployment tools are represented by dependency relationships among the plurality of abstract components and the plurality of deployment components;

deployment processes associated with designated deployment tools among the plurality of deployment tools are identified, based on the inheritance relationships between the abstract components and the concrete components; and an execution sequence of the deployment processes identified for respective ones of the plurality of constituent elements and preprocessing of designated deployment tools is determined, based on the dependency relationships among the plurality of abstract components and the plurality of deployment components.

8. The deployment method according to claim 5, further comprising: outputting the determined execution sequence, wherein, when an instruction to execute the deployment is input in response to the output of the execution sequence, the deployment processes identified for respective ones of the plurality of constituent elements are executed, according to the determined execution sequence.

9. A non-transitory computer readable storage medium recording thereon a program causing a computer to perform a method comprising:

storing, in association with each of a plurality of constituent elements constituting a system, setting information independent of deployment tools respectively used for deploying the plurality of constituent elements into an execution environment according to a configuration definition file with which setting sequence of the plurality of constituent elements is controllable;

storing, in association with each combination of each of the plurality of constituent elements and each of a plurality of deployment tools available for deploying corresponding one of the plurality of constituent elements, setting a character string describing a command representing a deployment process for deploying the corresponding one of the plurality of constituent elements by use of corresponding one of the plurality of deployment tools;

identifying, for each of the plurality of constituent elements, a deployment process associated with a combination of corresponding one of the plurality of constituent elements and a deployment tool designated from among the plurality of deployment tools, based on the component information;

determining an execution sequence of the deployment processes identified for respective ones of the plurality of constituent elements, based on dependency relationships among the plurality of constituent elements; and deploying each of the plurality of constituent elements by executing the deployment process identified for corresponding one of the plurality of constituent elements in accordance with the determined execution sequence, applying the setting information for the corresponding one of the plurality of constituent elements.

10. The non-transitory computer readable storage medium recording thereon the program according to claim 9 causing a computer to perform the method, wherein
the component information further includes preprocessing of each of the plurality of deployment tools;
an execution sequence of the deployment processes identified for respective ones of the plurality of constituent elements and preprocessing of designated deployment tools is determined, based on dependency relationships among the plurality of constituent elements and the plurality of deployment tools; and
the deployment processes identified for respective ones of the plurality of constituent elements and preprocessing of designated deployment tools are executed, according to a determined execution sequence.

\* \* \* \* \*